United States Patent
Roh et al.

(10) Patent No.: US 8,699,471 B2
(45) Date of Patent: Apr. 15, 2014

(54) SYSTEM AND METHOD FOR SCRAMBLING AND TIME-HOPPING

(75) Inventors: June Chul Roh, Allen, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 348 days.

(21) Appl. No.: 13/087,848

(22) Filed: Apr. 15, 2011

(65) Prior Publication Data

US 2011/0255453 A1 Oct. 20, 2011

Related U.S. Application Data

(60) Provisional application No. 61/324,615, filed on Apr. 15, 2010.

(51) Int. Cl.
*H04J 3/00* (2006.01)
(52) U.S. Cl.
USPC .......................... 370/336; 370/394; 370/395.4
(58) Field of Classification Search
USPC ......... 370/310, 328–329, 335–336, 342, 345, 370/394, 395.4, 458, 465, 468, 476
See application file for complete search history.

(56) References Cited

U.S. PATENT DOCUMENTS

| | | | | |
|---|---|---|---|---|
| 5,995,533 | A * | 11/1999 | Hassan et al. | 375/140 |
| 6,307,868 | B1 * | 10/2001 | Rakib et al. | 370/485 |
| 7,095,707 | B2 * | 8/2006 | Rakib et al. | 370/204 |
| 7,221,911 | B2 * | 5/2007 | Knobel et al. | 455/42 |
| 7,349,447 | B1 * | 3/2008 | Sung et al. | 370/535 |
| 7,430,257 | B1 * | 9/2008 | Shattil | 375/347 |
| 7,995,527 | B2 * | 8/2011 | Li et al. | 370/329 |
| 2004/0032918 | A1 * | 2/2004 | Shor et al. | 375/345 |
| 2009/0103720 | A1 * | 4/2009 | Karayil Thekkoott Narayanan | 380/34 |
| 2010/0202494 | A1 | 8/2010 | Roh et al. | |
| 2010/0246639 | A1 | 9/2010 | Roh et al. | |
| 2010/0260063 | A1 * | 10/2010 | Kubler et al. | 370/253 |
| 2011/0103437 | A1 * | 5/2011 | Karabinis | 375/219 |

OTHER PUBLICATIONS

Institute of Electrical and Electronics Engineers, Inc., "Draft Trial-Use Standard for Body Area Network," Section 10, IEEE P802.15.6/D02, New York, New York, Dec. 2010, 67 pages.

* cited by examiner

*Primary Examiner* — Kevin Mew
(74) *Attorney, Agent, or Firm* — Steven A. Shaw; Wade James Brady, III; Frederick J. Telecky, Jr.

(57) ABSTRACT

A system and method for scrambling and time-hopping in an ultra-wideband wireless network. In one embodiment, a wireless device includes a symbol mapper and a dynamic chip scrambler. The dynamic chip scrambler is configured to scramble each of a plurality of consecutive bursts of a time-hopped packet according to a pseudo-random scrambling sequence that varies from burst to burst.

22 Claims, 3 Drawing Sheets

SYSTEM AND METHOD FOR SCRAMBLING AND TIME-HOPPING

CROSS-REFERENCE TO RELATED APPLICATION

The present application claims priority to U.S. Provisional Patent Application No. 61/324,615, filed on Apr. 15, 2010; which is hereby incorporated herein by reference in its entirety.

BACKGROUND

Body area networks (BANs) are a low-power short-range wireless technology that can be used for medical applications, such as digital band-aids and pacemakers, and for entertainment and consumer electronics applications, including heads-up displays and wireless gaming. Body area networks are being designed for use in several radio frequency bands, including 400 MHz Medical Implant Communications Service ("MICS") band, 900 MHz and 2.4 GHz Industrial, Scientific and Medical ("ISM") band, and 3.1-10.6 GHz Ultra Wideband (UWB).

A symbol is a representation of one or more bit values, e.g., 0s or 1s, often used in wireless communications. The particular value represented by a symbol may be determined based on when a signal is transmitted by a device and when that signal energy is received by a device that is listening for signals. Symbols may be modulated, or made to appear to a receiving device as an intended value, in a multitude of ways. A transceiver, or a device capable of transmitting and receiving symbols, must agree with another transceiver on a modulation scheme in order for the two devices to communicate. In some modulation schemes, a symbol may be thought of as positions in which a signal may be transmitted. In these "pulse position modulation" schemes, transmission of a signal in one position may represent a first value, whereas transmission in another position may represent a different value.

A refinement of this scheme uses a burst (a concatenation of pulses or chips), as opposed to a single pulse, with multiple burst positions to represent a symbol. This scheme is called "burst position modulation." Multiple burst slots replace a single pulse position to represent a single symbol value, and the receipt of signal energy in any of the multiple burst slots for a particular bit is interpreted as a transmission of that particular symbol value. The burst slot in which a signal is transmitted to represent a particular symbol value may change from symbol to symbol. Changing, or hopping, the burst slot from one symbol to the next in a deterministic way is called time-hopping. The hopping pattern is known to both the transmitter and the receiver. Such time-hopping mitigates interference from neighboring devices and serves to make the transmitted signal more random, thereby reducing ripple in the spectrum.

Wireless transceivers may also apply scrambling to transmitted symbols. Scrambling adds randomness to a transmitted sequence, thereby spreading signal energy more evenly over a range of frequencies. Scrambling may be applied at various levels in the transceiver. For example, scrambling may be applied at the symbol level. A scrambled transmission must be descrambled by a receiving device. Consequently, transmitting and receiving devices must be synchronized with regard to the scrambling sequence applied to the transmission.

SUMMARY

A system and method for scrambling and time-hopping in an ultra-wideband wireless network. In one embodiment, a wireless device includes a symbol mapper and a dynamic chip scrambler. The dynamic chip scrambler is configured to scramble each of a plurality of consecutive bursts of a time-hopped packet according to a pseudo-random scrambling sequence that varies from burst to burst.

In another embodiment, a wireless device includes a symbol mapper and a dynamic chip scrambler. The symbol mapper is configured to map a given symbol to one of a plurality of available time slots of a symbol frame. The symbol mapper is configured to select a time slot for the given symbol based on a time slot of a previous burst, and a predetermined minimum number of the available time slots that separate the selected time slot from the time slot selected for a preceding symbol.

In yet another embodiment, a method includes receiving a packet. A pseudo-random value generator is initialized with a value extracted from a header of the packet. A time-hopping sequence is generated and used to time hop the symbols of the packet. A scrambling sequence is generated and used to scramble the chips of each burst of the packet. The time-hopping sequence and the scrambling sequence are based on an output of the pseudo-random value generator.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
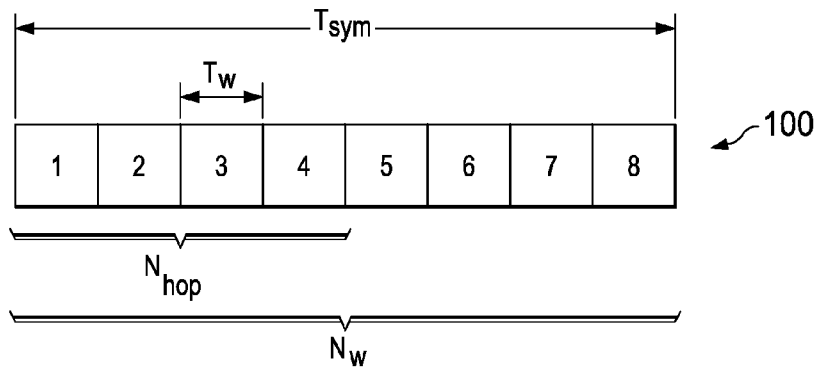
FIG. 1A shows an illustrative symbol frame configured for on-off keying in conjunction with time-hopping in accordance with various embodiments.

Various wireless networking standards (e.g., IEEE 802.15.4a, IEEE 802.15.6, etc.) support time-hopping in conjunction with other modulation techniques (e.g., on-off keying (OOK), phase-shift keying (PSK), etc). FIG. 1A shows an illustrative symbol frame 100 configured for on-off keying in conjunction with time-hopping in accordance with various embodiments. The frame 100 is of duration $T_{sym}$, and includes a plurality ($N_w$) of time slots (slots 1-8) each of $T_w$ duration. The frame 100 is sub-divided into two portions, each comprising $N_{hop}$ time slots, to allow ON-OFF signaling. For example, in an implementation of burst position modulation (BPM)/pulse position modulation (PPM), if a '0' is to be encoded, then a burst may be provided in one of the time slots 1-4. If, on the other hand, a '1' is to be encoded, then a burst may be provided in one of the time slots 108.

Figure 1B:
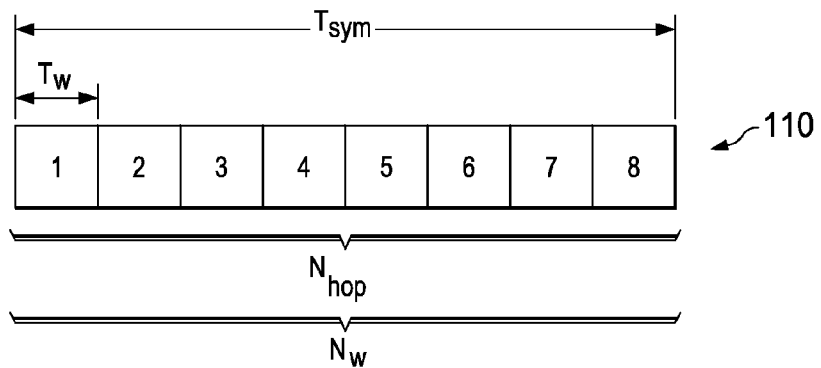
FIG. 1B shows an illustrative symbol frame configured for phase-shift keying in conjunction with time-hopping in accordance with various embodiment.

FIG. 1B shows an illustrative symbol frame 110 configured for phase-shift keying in conjunction with time-hopping in accordance with various embodiment. The symbol frame 110 is structurally similar to frame 100, but the number of time slots $N_{hop}$ available for time-hopping a symbol is equal to the total number of time slots ($N_w$) of the frame 110.

Some embodiments disclosed herein may apply other coding techniques in conjunction with OOK or PSK. For example, an embodiment may generate a block code (e.g., a 1/2 code, 4/8 code, etc.) for each symbol to be transmitted and then map each bit of the block code to a symbol frame 100, 110 using time-hopping with OOK or PSK as described above.

A transmitted signal takes a period of time to attenuate, or to become undetectable. This time period is referred to as channel delay spread (e.g., due to transmission of one signal along different paths, resulting in multiple receptions of the same signal, or multipaths in a wireless channel), and causes a receiving device to misinterpret the receipt of a signal (i.e., to determine that a signal has been received when, in fact, the receiving device is detecting energy from a previous signal that has not yet attenuated). The interference between symbols caused by multipath or other channel effects is referred to as inter-symbol interference.

To protect against inter-symbol interference, a guard interval (i.e., a time period during which no signal is transmitted) may be used (e.g., as in IEEE 802.15.4a UWB PHY). For example, in frame 100 a guard interval may be included between time slots 4 and 5, and following time slot 8. The guard interval should be sufficiently long to allow any transmitted signal become undetectable, before the next signal is expected. Unfortunately, such dedicated guard intervals reduce system throughput by increasing the length of the symbol frame.

In order to prevent spectral lines (i.e., concentration of energy in a narrow range of frequencies) in the bursts, chip scrambling can be applied to randomize the polarity of pulses within a burst. However, some types of scrambling (e.g., where the same scrambling sequence is repeatedly used in each symbol) may introduce undesirable pass band ripple.

Embodiments of the present disclosure apply dynamic scrambling to the bursts to prevent undesirable spectral lines. Embodiments also avoid dedicated guard intervals through use of intelligent time-hopping that ensures bursts are positioned only at locations that preclude interference with previous bursts. Embodiments are configured to base the dynamic scrambling and the intelligent time-hopping on the output of a single random (or pseudo-random) value generator.

Figure 2:
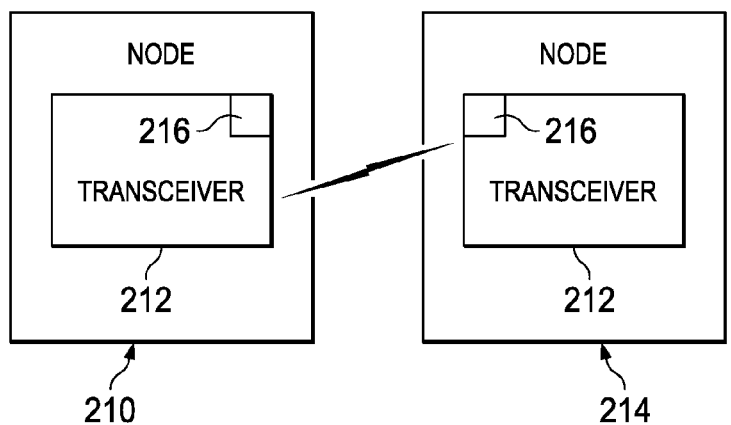
FIG. 2 shows a block diagram for a wireless network configured to use time hopping and dynamic burst scrambling in accordance with various embodiments.

FIG. 2 shows a representative wireless network (e.g., a body area network (BAN)) 200 configured to use time-hopping and dynamic burst scrambling in accordance with various embodiments. The wireless network 200 includes wireless devices (nodes) 210, 214. While only two wireless devices are shown, in practice the network 200 may include more than two wireless devices. Each node 210, 214 may include one or more sensors (e.g., motion, temperature, electrical activity sensors, etc.), a processor, an output device (e.g., audio or video transducers), etc. Each node 210, 214 includes a transceiver 212 that communicatively couples the nodes 210, 214 to each other, or to one or more other nodes. Embodiments of the transceiver 212 may be configured for communication over relatively short distances applicable to the BAN 200. For example, the distance between nodes 210, 214 may be three meters or less in a BAN.

The transceivers 212 include a PHY 216 configured for use in the wireless network 200. Embodiments of the PHY 216 use burst position modulation (BPM) and/or pulse position modulation ("PPM"). Some embodiments use BPM/PPM in conjunction with a different modulation technique, such as on/off keying ("OOK"), phase shift keying ("PSK"), differential binary PSK and/or differential quaternary PSK. Some embodiments use BPM/PPM exclusively, which reduces implementation complexity when compared to embodiments using BPM/PPM in combination with another modulation technique. Some embodiments use one of OOK, PSK or differential PSK exclusively, which also reduces implementation complexity when compared to embodiments using OOK, PSK or differential PSK in combination with another modulation technique. Some embodiments of the PHY 216 use a channel bandwidth of 499.2 mega-hertz ("MHz"), 512 MHz or 528 MHz, with center frequencies that enable a low-power transceiver architecture.

Embodiments of the PHY 216 determine which time slots of a symbol frame are suitable for transmitting a signal to avoid inter-symbol interference. No dedicated guard interval is provided in the symbol frame. By using a symbol structure with no dedicated guard interval, embodiments of the PHY 216 increase the number of time slots per symbol when compared to a symbol structure including dedicated guard intervals, which results in enhanced interference mitigation. Alternatively, embodiments of the PHY 216 may increase data rate while maintaining the same slot length as an embodiment allocating one or two guard intervals per symbol period. Embodiments of the PHY 216 also provide dynamic scrambling of pulses within each burst. Such scrambling applies a different scrambling sequence to each symbol of a packet, thereby avoiding generation of spectral lines in the transmit signal.

Figure 3:
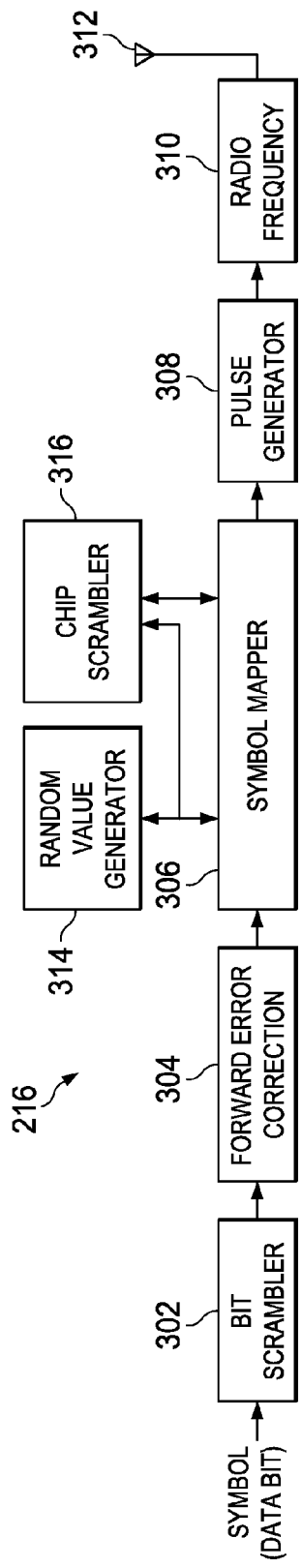
FIG. 3 shows a block diagram for a physical layer (PHY) of a transceiver configured to provide time-hopping and dynamic burst scrambling in accordance with various embodiments.

FIG. 3 shows a block diagram for a PHY 216 of an impulse radio ultra wideband (IR-UWB) transceiver 212 in accordance with various embodiments. The PHY 216 includes a bit scrambler 302, a forward error correction ("FEC") encoder 304, a symbol mapper 306, a chip scrambler 316, a random value generator 314, a pulse generator 308, radio frequency ("RF") circuitry 310, and an antenna 312. The bit scrambler 302 is a randomizing system used to eliminate long runs of identical symbols. The scrambler 302 may be implemented, for example, as either a side-stream scrambler (e.g., per IEEE 802.11a or ECMA-368) or a self-synchronizing scrambler (e.g., per IEEE 802.11b). The FEC encoder 304 adds redundancy to the transmitted symbols, thereby allowing a receiver to identify and correct channel induced errors in received data.

The symbol mapper 306 maps a scrambled or encoded input symbol to a signal representative of the symbol. Specifically, the symbol mapper 306 determines which time slots of the symbol frame are suitable for transmitting a signal to avoid inter-symbol interference and assigns the symbol to a time slot. The time slot determination may be based on a time-hopping sequence generated by or provided to the symbol mapper 306. The symbol mapper 306 does not generate a dedicated guard interval in a fixed location in a symbol frame when transmitting the symbol. As used herein, "symbol mapper" is used for simplicity and includes both the ability to convert a symbol to a signal in the case of a transmitter. A receiver symbol demapper converts a received signal into a symbol and may also be referred to as a "symbol mapper."

The random number generator 314 is coupled to the symbol mapper 306 and to the chip scrambler 316. As noted above, the random number generator 314 may include a pseudo-random number generator. The random number generator 314 provides output values to the chip scrambler 316 for generation of a scrambling sequence and to the symbol mapper 306 for generation of the time-hopping sequence. In some embodiments of the PHY 216 the random number generator 314 or a different component may generate and/or provide the time-hopping sequence to the symbol mapper 306.

Figure 4:
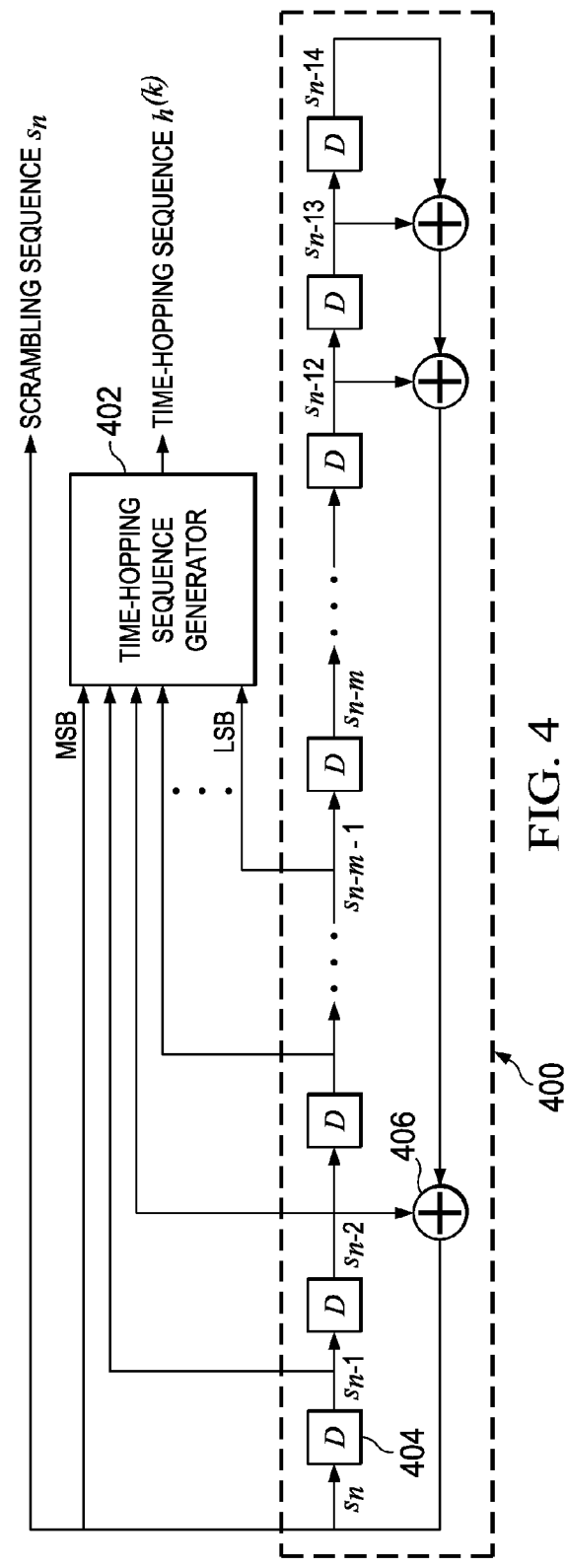
FIG. 4 shows a block diagram for a linear feedback shift register configured to generate pseudorandom values for a PHY providing time-hopping and dynamic burst scrambling in accordance with various embodiments.

Some embodiments of the random number generator 314 may include a pseudo-random number generator implemented as a linear feedback shift register (LFSR). FIG. 4 shows a block diagram of an LSFR 400 suitable for use in the random number generator 314. LFSR 400 includes a series of storage registers 404 and associated combinatorial logic (e.g., exclusive-or gates) 406. The LFSR 400 is configured to implement the polynomial $$g(x)=1+x^2+x^{12}+x^{13}+x^{14},$$

while other embodiments of an LFSR suitable for use with the random number generator 314 may implement a different polynomial.

A PHY layer protocol data unit (a packet) may include a Synchronization Header (SHR), a Physical-layer Header (PHR), and a Physical-layer Service Data Unit (PSDU). The random number generator 314 may be initialized upon transmission of the first bit of the PHR, and run without being reset while the remainder of the packet is transmitted. The SHR may include a preamble sequence that provides coarse timing synchronization, packet detection, and carrier frequency offset recovery to a receiving node. The preamble sequence may be a sequence, such as a Kasami sequence, that may vary from packet to packet. Some embodiments of the random number generator 314 are initialized with at least a portion of the preamble sequence. For example, the LFSR 400 may be initialized in accordance with Table 1 below showing eight values that may be extracted from the preamble to initialize the LFSR 400.

TABLE 1

| Preamble code number | Initial state of LFSR [$s_{-14}\ s_{-13}\ s_{-12}\ \ldots\ s_{-1}$] |
|---|---|
| 0 | 11111101010110 |
| 1 | 00011000100100 |
| 2 | 10001111101111 |
| 3 | 01000100001010 |
| 4 | 10100001111000 |
| 5 | 11010011000001 |
| 6 | 01101010011101 |
| 7 | 00110110110011 |

The LFSR 400 may be clocked $N_{cpb}$ times per symbol frame at the peak pulse repetition frequency of the PHY 216 (e.g., 4.992 Megahertz in some embodiments). $N_{cpb}$ represents the number of chips per burst (i.e., pulses per burst) generated by the symbol mapper 306.

The chip scrambler 316 is coupled to or integrated with the symbol mapper 306. The chip scrambler 316 applies a scrambling sequence to the chips of each burst initiated by the symbol mapper 306. In embodiments using the LFSR 400, the scrambling sequence applied by the chip scrambler 316 is generated as $$s_n = s_{n-2} \oplus s_{n-12} \oplus s_{n-13} \oplus s_{n-14}, n=0,1,2,\ldots$$

where $\oplus$ denotes modulo-2 addition. The scrambling sequence for the k-th symbol is $$s_{kN_{cpb}+m}, n=0,1,\ldots N_{cpb}-1.$$

A time-hopping sequence generator 402 is coupled to the LFSR 400 (see FIG. 4). In other embodiments, the time-hopping sequence generator 402 may coupled to a different type of number generator. The time-hopping sequence generator 402 may be included in the random number generator 314 or in the symbol mapper 306, and is configured to generate a time-hopping sequence value (a time slot value) for each symbol to be mapped by the symbol mapper 306. To generate a time-hopping sequence value for a k-th symbol, the time-hopping sequence generator 402 may first generate an integer number $z^{(k)}$ using the left-most m bits provided by the random value generator 314 (e.g., the left-most m outputs of shift registers of the LFSR 402) as:

$$z^{(k)} = 2^0 s_{kN_{cpb}} + 2^1 s_{kN_{cpb}+1} + \ldots + 2^{m-1} s_{kN_{cpb}+m-1}$$

where $m=\log_2(N_{hop})$, and $N_{hop}$ is the number of time slots that can contain an active burst waveform for time-hopping. $N_{hop}$ is a power of two, and consequently, m is an integer.

The time-hopping sequence generator 402 further calculates:

$$\alpha = h^{(k-1)} - \gamma,$$

where $h^{(k-1)}$ is the time-hopping sequence value applied to symbol k−1 (the previous symbol), and $$\gamma = N_{hop} - N_{guard} - 1$$

where $N_{guard}$ is a predetermined number of time slots to be applied as a guard interval for each symbol at the current data rate. Embodiments may pre-compute the value of γ for each data rate. In some embodiments, $$N_{guard} = \frac{\tau_{max}}{T_w},$$

where $\tau_{max}$ is the maximum expected delay spread of the channel (e.g., 128 nanoseconds (nsec)), and $T_w$ is the duration of each time slot.

Using the value α determined above, the time-hopping sequence generator 402 computes $$N_{reduced} = N_{hop} - \alpha,$$

where $N_{reduced}$ is the number of time slots available for positioning the current symbol determined in light of the time slot of the previous symbol and the desired guard interval.

Finally, the time-hopping sequence generator 402 generates the time-hopping sequence value for the current symbol as:

$$h^{(k)} = \begin{cases} z^{(k)}, & \text{if } h^{(k-1)} \leq \gamma \\ [(z^{(k)} + c^{(k)}) \bmod N_{reduced}] + \alpha, & \text{if } h^{(k-1)} > \gamma \end{cases}$$

where $c^{(k)} = [k \bmod 2^8]$, and $h^{(-1)} = 0$, and provides the time-hopping sequence value to the symbol mapper 306 which initiates a burst (or a pulse) in the indicated time slot. Thus, if the previous symbol time slot ($h^{(k-1)}$) was within the first γ time slots of the frame, then $z^{(k)}$ is selected as the time slot for the current symbol. Otherwise, a randomized time slot is selected from among the $N_{reduced}$ time slots disposed towards the end of the symbol frame. In this way, the symbol mapper 306 maintains randomization of symbol positioning while reducing inter-symbol interference without dedicated guard intervals.

Referring again to FIG. 3, the pulse generator 308 generates pulses for the each symbol in the time slot and with the polarities specified by the symbol mapper 306. In some embodiments, the pulse generator 308 generates pulses having a width of approximately 2 nsec. In other embodiments, the pulse generator 308 generates pulses of a different width or using other waveforms (e.g., a chirp). The RF circuitry 310 drives the output of the pulse generator 308 onto the antenna 312 for conversion from conducted to an airwave form.

Figure 5:
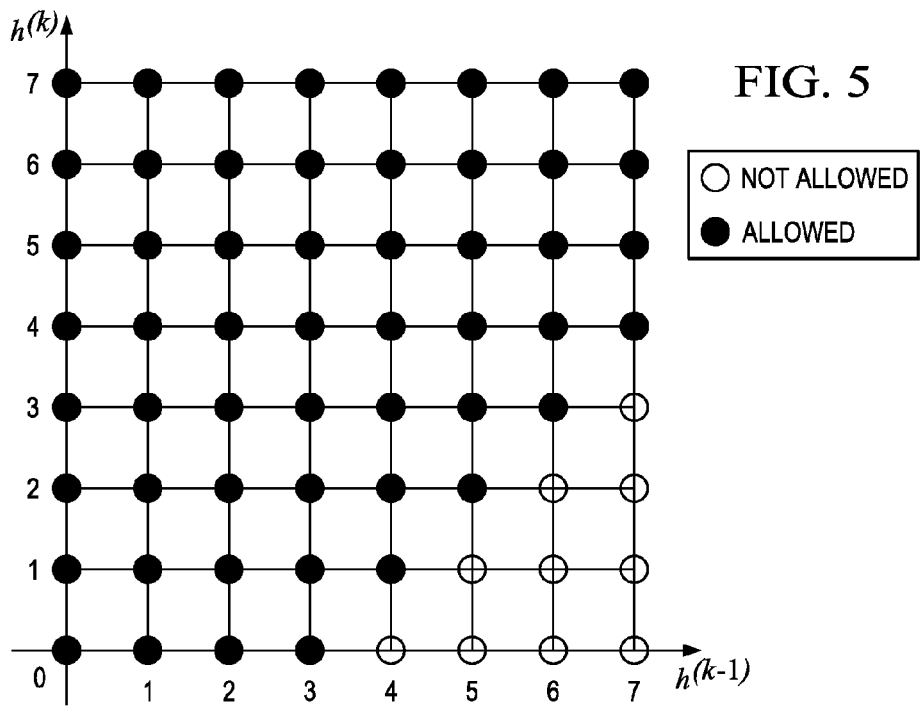
FIG. 5 shows an exemplary range of time-hopping sequence values applicable to a symbol modulated in accordance with various embodiments.

FIG. 5 shows an exemplary range of possible time-hopping sequence values that can be applied to the k-th symbol, $h^{(k)}$, for a given value for the time-hopping sequence value, $h^{(k-1)}$, for the previous symbol. In this example, $N_{hop}=8$, $N_{guard}=4$, and γ=3. The time-hopping sequence applied by embodiments of the present disclosure guarantees that the two bursts for the two consecutive symbols are separated by at least $N_{guard}T_{burst}$ seconds to efficiently avoid inter-symbol interference. The timing-hopping sequence provides for co-channel interference rejection as well as spectral smoothing of the transmitted signal.

As noted above, embodiments of the PHY 216 may be applied with non-coherent or differentially coherent modulation. Table 2 below shows parameters relevant to the various data rates applicable to non-coherent modulation using an ultra-wideband PHY 216 in accordance with the IEEE 802.15.6 standard.

TABLE 2

Data rates for non-coherent modulation

| R0, R1, R2 | PRF (MHZ) | $N_w$ | $N_{hop}$ | $T_w$ nsec | $T_{sym}$ nsec | Sym. rate (Msps) | FEC rate | Bit rate (Mbps) | $N_{cpb}$ | $N_{guard}$ | P.PRF (MHz) |
|---|---|---|---|---|---|---|---|---|---|---|---|
| 0 0 0 | 0.4882 | 32 | 16 | 64 | 2048 | 0.4882 | 0.81 | 0.3954 | 32 | 2 | 499.2 |
| 0 0 1 | 0.9765 | 32 | 16 | 32 | 1024 | 0.9765 | 0.81 | 0.791 | 16 | 4 | 499.2 |
| 0 1 0 | 1.9531 | 32 | 16 | 16 | 512 | 1.9531 | 0.81 | 1.582 | 8 | 8 | 499.2 |
| 0 1 1 | 3.9062 | 32 | 16 | 8 | 256 | 3.9062 | 0.81 | 3.164 | 4 | 10 | 499.2 |
| 1 0 0 | 7.8125 | 32 | 16 | 4 | 128 | 7.8125 | 0.81 | 6.3281 | 2 | 12 | 499.2 |
| 1 0 1 | 15.625 | 32 | 16 | 2 | 64 | 15.625 | 0.81 | 12.656 | 1 | 12 | 499.2 |
| 1 1 0 | | | | | | | | | | | |
| 1 1 1 | | | | | | | | | | | |

In Table 2:

PRF (pulse repetition frequency) is the number of pulses transmitted per second.

$N_w$ is the number of time slots within a symbol frame.

$N_{hop}$ is the number of time slots that can contain a symbol for time-hopping.

$T_w$ is the time slot duration.

$T_{sym}$ is the duration of the symbol frame.

Sym. rate is the number of symbols transmitted per second.

FEC rate is the coding rate (information bits/coded bits).

Bit rate is the coded bit rate (FEC_rate/$T_{sym}$ for non-coherent modulation).

$N_{cpb}$ is the number of pulses concatenated to form a burst.

$N_{guard}$ is the number of time slots to provide as guard interval.

P.PRF (peak PRF) is maximum rate at which pulses are emitted.

Of the aforementioned parameters, $N_{hop}$ and $N_{guard}$ are used to generate a time-hopping sequence. Using $N_{guard}$ as specified in Table 2 guarantees at least $T_w N_{guard}$ nsec of separation between the waveforms for two consecutive OOK symbols to avoid inter-symbol-interference.

Table 3 below shows parameters relevant to the various data rates applicable to differentially coherent modulation using an ultra-wideband PHY 216 in accordance with the IEEE 802.15.6 standard.

TABLE 3

Data rates for differentially coherent modulation

| R0, R1, R2 | PRF (MHZ) | $N_w$ | $N_{hop}$ | $T_w$ nsec | Spr | $T_{sym}$ nsec | Modulation | Sym. rate (Msps) | FEC rate | Bit rate (Mbps) | $N_{cpb}$ | $N_{guard}$ | P.PRF (MHz) |
|---|---|---|---|---|---|---|---|---|---|---|---|---|---|
| 0 0 0 | 0.4882 | 32 | 32 | 64 | 1 | 2048 | DBPSK | 0.4882 | 0.81 | 0.3954 | 32 | 2 | 499.2 |
| 0 0 1 | 0.9765 | 32 | 32 | 32 | 1 | 1024 | DBPSK | 0.9765 | 0.81 | 0.791 | 16 | 4 | 499.2 |
| 0 1 0 | 1.9531 | 32 | 32 | 16 | 1 | 512 | DBPSK | 1.9531 | 0.81 | 1.582 | 8 | 8 | 499.2 |

TABLE 3-continued

Data rates for differentially coherent modulation

| R0, R1, R2 | PRF (MHZ) | $N_w$ | $N_{hop}$ | $T_w$ nsec | Spr | $T_{sym}$ nsec | Modulation | Sym. rate (Msps) | FEC rate | Bit rate (Mbps) | $N_{cpb}$ | $N_{guard}$ | P.PRF (MHz) |
|---|---|---|---|---|---|---|---|---|---|---|---|---|---|
| 0 1 1 | 3.9062 | 32 | 32 | 8 | 1 | 256 | DBPSK | 3.9062 | 0.81 | 3.164 | 4 | 16 | 499.2 |
| 1 0 0 | 7.8125 | 32 | 32 | 4 | 1 | 128 | DBPSK | 7.8125 | 0.81 | 6.3281 | 2 | 20 | 499.2 |
| 1 0 1 | 15.625 | 32 | 32 | 4 | 1 | 128 | DQPSK | 7.8125 | 0.81 | 12.656 | 2 | 20 | 499.2 |
| 1 1 0 | 3.9062 | 32 | 32 | 8 | 7 | 1792 | DBPSK | 0.558 | 0.81 | 0.452 | 4 | 16 | 499.2 |
| 1 1 1 | 3.9062 | 32 | 32 | 8 | 7 | 1792 | DQPSK | 0.558 | 0.81 | 0.904 | 4 | 16 | 499.2 |

The parameters listed in Table 3 are similar to those of Table 2 above with the following additions and exceptions:
Spr. is spreading factor.
Bit rate is the coded bit rate (FEC_rate/$T_{sym}$ for DBPSK and 2FEC_rate/$T_{sym}$ for DQPSK).
Modulation is either differential binary phase shift keying (DBPSK) or differential quadrature phase shift keying (DQPSK).

As noted with regard to Table 2, $N_{hop}$ and $N_{guard}$ are used to generate a time-hopping sequence. However, for differentially coherent modulation $N_{hop}$ allowing $N_{hop}$ to be used to generate time-hopping sequences. Using $N_{guard}$ as specified in Table 3 guarantees at least $T_w N_{guard}$ nsec of separation between the waveforms for the two consecutive DPSK symbols to avoid inter-symbol-interference (ISI).

Figure 6:
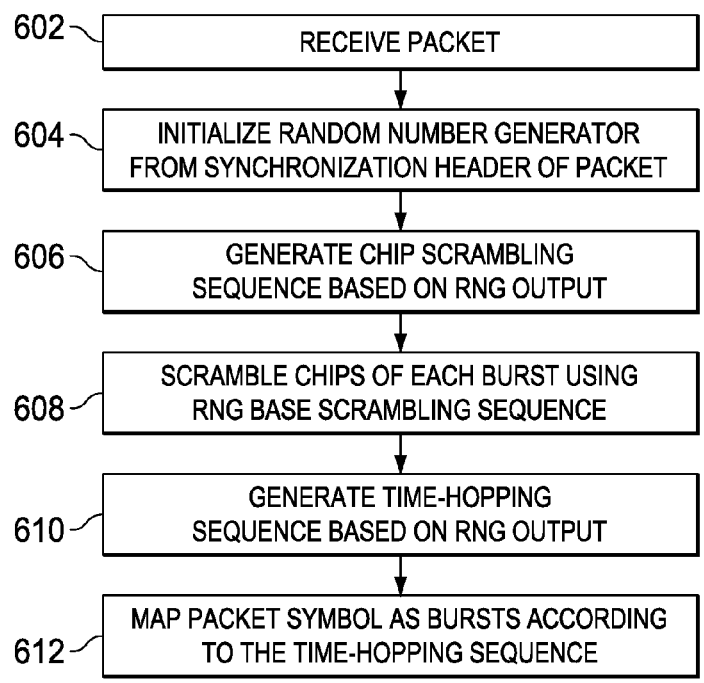
FIG. 6 shows a flow diagram for a method for time-hopping and dynamic burst scrambling a symbol in accordance with various embodiments.

FIG. 6 shows a flow diagram for a method for time-hopping and dynamic burst scrambling a symbol in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be implemented by a processor executing instructions stored in a computer readable medium.

In block 602, the wireless network 200 is operating, and the nodes 210, 214 are communicating via time-hopped packets. The PHY 216 receives a packet to be modulated and transmitted. Alternatively, the PHY 216 receives a packet that was transmitted by a different node for demodulation.

In block 604, the random value generator 314 is initialized to provide values for use by the symbol mapper 306 and/or the chip scrambler 316, and/or provide values to a component that generates time-hopping and/or scrambling sequence values for the symbol mapper 306, and/or the chip scrambler 316. In some embodiments, the random value generator 314 is initialized with a seed value extracted from the received packet. The seed value may include at least a portion of a packet synchronization header that may change from packet to packet. The random value generator 314 may include an LFSR 400 that generates pseudorandom values.

In block 606, the chip scrambler 316 generates dynamic chip scrambling sequences based on an output of the random value generator 314. The chip scrambling sequences change from symbol to symbol reducing the incidence of undesirable spectral lines in the transmitted signal. The chip scrambler 316 scrambles the pulses of each burst using the dynamic scrambling sequences in block 608.

In block 610, the time-hopping sequence generator 402 generates time-hopping sequences to apply to the symbols of the packet. The time-hopping sequences are based on an output of the random value generator 314. Each time-hopping sequence considers the time slot selected for the previous symbol and the desired number of time slots serving as a guard interval. Thus, the time-hopping sequence generator 402 selects a randomized time slot for each symbol that reduces inter-symbol interference while requiring no dedicated guard intervals. The symbol mapper 306 maps the packet symbols to time slots in accordance with the time-hopping sequence in block 612.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
   a symbol mapper, and
   a dynamic chip scrambler;
   wherein the dynamic chip scrambler is configured to scramble each chip of a plurality of consecutive bursts of a time-hopped packet according to a pseudo-random scrambling sequence that varies from burst to burst.

2. The wireless device of claim 1, comprising a pseudo-random value generator, wherein the dynamic chip scrambler is configured to generate the pseudo-random scrambling sequence based on an output of the pseudo-random value generator.

3. The wireless device of claim 2, wherein the pseudo-random value generator is a linear feedback shift register.

4. The wireless device of claim 2, wherein the symbol mapper is configured to select a time slot for a symbol based on a combination of a number of sequential output values of the pseudo-random value generator, and wherein the number of sequential output values corresponds to a number of time slots available in a symbol frame.

5. The wireless device of claim 1, wherein the symbol mapper is configured to select a time slot for a symbol based on a time slot selected for a previous symbol and a predetermined number of time slots serving as a guard interval.

6. The wireless device of claim 1, wherein the symbol mapper is configured to initialize the pseudo-random scrambling sequence based on a value included in a preamble of the packet, wherein the value varies from packet to packet.

7. The wireless device of claim 6, wherein the value is a Kasami sequence.

8. The wireless device of claim 1, wherein the symbol mapper is configured to determine a time slot of each symbol of a packet received via a wireless network.

9. A wireless device, comprising:
   a symbol mapper, and
   a dynamic chip scrambler;
   wherein the symbol mapper is configured to map a given symbol to one of a plurality of available time slots of a symbol frame, the selection of a time slot based on a time slot of a previous symbol, and a predetermined minimum number of time slots that separate the time slot from the time slot of the previous symbol.

10. The wireless device of claim 9, wherein the symbol mapper is configured to select the time slot such that the time slot follows the time slot of the previous symbol of the packet by at least the predetermined minimum number of time slots; and wherein the selected time slot and the time slot of the previous symbol are not separated by a dedicated guard interval defined by the symbol structure.

11. The wireless device of claim 9, comprising a pseudo-random value generator configured to generate a pseudo-random time-hopping sequence, wherein the symbol mapper is configured to select the time slot based on the pseudo-random time-hopping sequence.

12. The wireless device of claim 11, wherein the symbol mapper is configured to select the time slot based on a number of sequential output values of the pseudo-random value generator, and wherein the number of sequential output values corresponds to a number of time slots available in the symbol frame.

13. The wireless device of claim 11, wherein the wireless device is configured to initialize the pseudo-random value generator for each packet to a value included in a preamble of the packet.

14. The wireless device of claim 11, wherein the dynamic chip scrambler is configured to generate a pseudo-random scrambling sequence based on an output of the pseudo-random value generator.

15. The wireless device of claim 9, wherein the dynamic chip scrambler is configured to scramble each of a plurality of consecutive bursts of a packet according to a pseudo-random scrambling sequence that varies from burst to burst.

16. The wireless device of claim 9, wherein the symbol mapper is configured to determine a time slot of each burst of a packet received via a wireless network.

17. A method, comprising:
receiving, by a wireless device, a packet;
initializing, by the wireless device, a pseudo-random value generator with a value extracted from a header of the packet;
generating, by the wireless device, a time-hopping sequence used to vary time slots associated with symbols of the packet; and
generating by the wireless device, a scrambling sequence used to scramble the chips of each burst of the packet;
wherein the time-hopping sequence and the scrambling sequence are based on an output of the pseudo-random value generator.

18. The method of claim 17, wherein generating the time-hopping sequence comprises selecting a time slot for a symbol based on a number of sequential output values of the pseudo-random value generator, and wherein the number of sequential output values corresponds to a number of available time slots.

19. The method of claim 17, wherein generating the time-hopping sequence comprises selecting a time slot for a symbol based on a time slot selected for a previous symbol and a predetermined number of time slots serving as a guard interval.

20. The method of claim 19, wherein the predetermined number of time slots is based on a maximum delay spread value and a burst interval.

21. The method of claim 17, wherein generating the scrambling sequence comprises adding, modulo-2, second and twelfth through fourteenth stage outputs of the pseudo-random value generator.

22. The method of claim 17, wherein initializing the pseudo-random value generator comprises extracting a Kasami sequence from a preamble of the header and loading the Kasami sequence into a linear feedback shift register.

* * * * *